(12) United States Patent
Kessler et al.

(10) Patent No.: US 8,201,771 B2
(45) Date of Patent: Jun. 19, 2012

(54) HELICOPTER ROTOR CONTROL SYSTEM WITH INDIVIDUAL BLADE CONTROL

(75) Inventors: Christoph Kessler, Braunschweig (DE); Daniel Furst, Kassel (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 26 days.

(21) Appl. No.: 12/986,664

(22) Filed: Jan. 7, 2011

(65) Prior Publication Data

US 2012/0068005 A1   Mar. 22, 2012

Related U.S. Application Data (62) Division of application No. 11/579,281, filed as application No. PCT/IB2005/004194 on May 6, 2005, now Pat. No. 7,900,869.

(60) Provisional application No. 60/568,828, filed on May 6, 2004.

(51) Int. Cl.
*B64C 27/54* (2006.01)

(52) U.S. Cl. .................................. 244/17.13; 244/194

(58) Field of Classification Search ............. 244/17.13, 244/39, 17.11, 194; 416/147, 31, 159, 134 A; 702/33

See application file for complete search history.

(56) References Cited

FOREIGN PATENT DOCUMENTS

| DE | 199 23 154 A1 | 11/1999 |
|---|---|---|
| GB | 2 339 606 A | 2/2000 |

OTHER PUBLICATIONS

C. Kessler: "Open Loop Flight Test Results and Closed Loop Status if the IBC System on the CH-53G Helicopter" 59th Annual Forum of the American Helicopter Society International, May 6, 2003-May 8, 2003 pp. 1-18.
Arnold U T P et al.: "Certification, Ground and Flight Testing of an Experimental IBS System for the CH-53G Helicopter" Annual Forum Proceedings, vol. 1, Jun. 11, 2002 (Jun. 22, 2002), pp. 297-308.
O. Kunze et al: "Development of an Individual Blade Control System for the Sikorsky CH53G Helicopter" American Helicopter Society 55th Annual Forum, 1999, pp. 1-10.
Richter P. et al. Association Aeronautique at Astronautique de France. "Design and First Test of Individual Blade Control Actuators" Proceedings for the European Rotorcraft Forum. Glasgow, Sep. 18-20, 1990, GB, vol. 2 Forim 16, Sep. 18, 1999, pp. 6301-6309.
S.A. Jacklin et al: "Full-Scale Wind Tunnel Test of an Individual Blade Control System for a UH-60 Helicopter" 58th Forum of the American Helicopter Society, Jun. 11, 2002-Jun. 13, 2002 pp. 1-12.

*Primary Examiner* — Tien Dinh
(74) *Attorney, Agent, or Firm* — Davis & Bujold, P.L.L.C.

(57) ABSTRACT

A method of controlling rotor pitch in a helicopter comprising the steps of: generating at least one blade dynamics signal representing at least one dynamic force acting on at least one of a rotor blade rotating assembly and a helicopter non-rotating assembly, the rotor blade rotating assembly including a plurality of rotor blades and a pitch actuator for each rotor blade; extracting information representing the at least one dynamic force; generating a dynamic force compensation output representing a compensation for at least a portion of the at least one dynamic force; receiving flight control signals directing flight of the helicopter from flight controls of the helicopter; generating from the flight control signals and the dynamic force compensation output a compensated pitch control signal for each blade of the rotor blade rotating assembly, and providing a compensated pitch control signal to compensate for a portion of the at least one dynamic force.

5 Claims, 10 Drawing Sheets

HELICOPTER ROTOR CONTROL SYSTEM WITH INDIVIDUAL BLADE CONTROL

This application is a divisional of U.S. Patent Application Ser. No. 60/568,828 filed on May 6, 2004, which is a National Stage completion of PCT/IB2005/004194 filed May 6, 2005.

FIELD OF THE INVENTION

The present invention relates to a method and apparatus for individual actuation and control of the rotor blades of a helicopter for reduction of noise, vibration, power consumption and control load.

BACKGROUND OF THE INVENTION

Common problem in the control and operation of rotary wing aircraft, such as helicopters, is in the control of the pitch of the rotor blades as the rotor rotate to provide lift and control to the helicopter. As is well known, the lift and control provided by the rotor blades is generally achieved by altering the pitch of the rotor blades as the blades rotate, which in turn results in rapidly changing dynamic loads on the blades during rotation, due in part to the dynamic forces induced due to the changing pitches of the blades and in part due to aerodynamic forces acting on the blades. These problems are compounded by dynamic forces, such as vibration, from the helicopter power and drive trains and aerodynamic forces acting on the body and other surfaces of the helicopter.

These problems, in turn, result in yet other problems, such as excessive noise generated by the rotors, increased power consumption, increased control loads on the helicopter control systems, including the pilot, and increased vibration and stresses on the entire rotor and power system and the components thereof and on the structural components of the aircraft.

The rotor control systems of the prior art have generally attempted to control the pitch of the rotor blades by direct means, starting with the pilot controls and extending through the actual rotor control mechanisms which, as is well known and for example, include a swash plate pitch horns for controlling the actual pitches of the blades. In general, however, the rotor control systems of the prior art have generates a single control signal of some form, that is, as an electronic or electrical signal or as a mechanical or hydraulic force, for the entire rotor system, and has phase shafted this control signal, by actuation of the swash plate, to actuate the pitch of the individual blades around the rotation path of the blades. This approach, however, does not address the sources of vibration and other unwanted physical effects resulting from the rotor blades as individual elements in dynamic motion around the rotation path.

Other approaches to the reduction of rotor noise and vibration have been directed to, for example, the physical structure and materials of the rotor blades and the blade actuation mechanisms. While advantageous in some respects, these approaches again do not address the effects of vibration and other unwanted physical effects resulting from the rotor blades as individual elements in dynamic motion around the rotation path. These methods instead essentially attempt to dissipate the vibration in the structure or materials of the blades and the drive train, which shifts the end result of the problem but which does not address the adverse results in terms of such matters as, for example, excessive wear of the rotor, drive train and structural components, fuel consumption and control system load. In fact, these approaches may worsen the problems in some respects by substituting a quieter rotor material for a more durable rotor material.

The present invention addresses these and related problems of the prior art.

SUMMARY OF THE INVENTION

The present invention is directed to a method and apparatus for controlling the pitch of individual rotor blades of a helicopter to reduce any or all of control loads imposed on the rotating rotor control elements, vibration in the rotating or non-rotating elements of the helicopter, and reducing noise generated by the rotating rotor blades.

The method of the present invention involves the steps of generating at least one blade dynamics signal representing at least one dynamic force acting on at least one of a rotor blade rotating assembly that includes a plurality of rotor blades and a pitch actuator for each rotor blade wherein the dynamic forces may include control loads, vibration or noise and may be imposed on either or both of the rotating and non-rotating elements of the helicopter. The method of the present invention extracts information representing the at least one dynamic force and generates a dynamic force compensation output that represents a compensation for at least a portion of the at least one dynamic force. The method of the present invention then generates a compensated pitch control signal for each blade of the rotor blade rotating assembly from flight control signals directing flight of the helicopter and the dynamic force compensation output and provides a compensated pitch control signal to the pitch actuator of each rotor blade wherein the compensation factor of the pitch control signal compensates for the dynamic force.

According to the present invention, the processes for dynamically controlling the pitch of each rotor blade individually may be performed by time domain processes or, preferably, by frequency domain processes. Further according to the present invention, the blade dynamics signal may represent vibration in non-rotating elements of the helicopter or control loads in rotating elements of the rotor blade rotating assembly, and when the dynamic force is vibration in non-rotating elements of the helicopter, the extracted information represents an $N^{th}$ harmonic of the at least one blade dynamics signal, and when the dynamic force is control loads in rotating elements of the rotor blade rotating assembly, the extracted information represents a second harmonic of the at least one blade dynamics signal.

The apparatus of the present invention is an individual blade control system for controlling rotor pitch in a helicopter control system wherein the helicopter control system includes pilot controls for generating pilot control inputs directing operation of a rotor assembly that includes a plurality of blades mounted to a rotor hub supported by a rotating shaft and a blade actuator responsive to the pilot control signals and coupled to the rotor assembly for controlling pitch of the blades.

According to the present invention, the individual blade control system includes at least one blade dynamics sensor for generating at least one blade dynamics signal representing a corresponding blade dynamics factor and a plurality of individual blade actuators wherein each individual blade actuator corresponds to a blade and controls the pitch of the corresponding blade. The system includes a blade pitch controller that in turn includes an inner control loop for each blade that controls the blade pitch position by matching an actual pitch position of the blade actuator to a commanded actuator pitch position by comparing an actuator pitch position output representing the actual stroke position of the blade actuator with the corresponding commanded actuator pitch position and generating a corresponding corrected actuator position output to the blade actuator.

An outer control loop in turn operates to reduce control loads, on the blade actuators, including vibration, and includes a system identification mechanism receiving one or more blade dynamics signals and generating modeled outputs representing a linear T-matrix model of the helicopter control system. A controller mechanism then generates a commanded actuator stroke position output for each blade actuator, and includes an outer loop processor that receives flight control commands and the modeled outputs of the system identification mechanism and generates a commanded stroke output for each individual blade actuator wherein each commanded stroke output including a flight control command component and a control load reduction component.

The outer control loop may further include an intermediate control loop for each blade that operates to minimize deviations between the actual blade pitch positions. The intermediate control loop includes a blade pitch deviation processor that receives the actuator pitch position outputs of each of the actuator controllers and determines the amplitude and phase components of deviations between the actual pitch positions of the blades. An amplitude/phase compensation processor receives the amplitude and phase components of the deviations between the actual pitch positions of the blades and representations of corresponding commanded stroke outputs for each individual blade actuator from the outer loop processor and generates a commanded actuator stroke position output for each blade actuator.

In a presently preferred embodiment of the invention, the system identification mechanism may be implemented as a recursive least square process, a recursive least square process with a forgetting factor, a stabilized recursive least square process or a Kalman filter process operating in the frequency domain and will generate a frequency domain T-matrix model of the helicopter control system. In a like manner, the outer loop processor will be a frequency domain processor receiving the flight control commands and the frequency domain modeled outputs of the system identification mechanism and will generate a frequency domain commanded stroke output for each individual blade actuator wherein each commanded stroke output will including a flight control command component and a control load reduction component. The outer control loop will also include a frequency to time domain converter for converting the frequency domain commanded stroke outputs of the outer loop processor to corresponding time domain commanded stroke outputs.

In a presently preferred embodiment of the invention, the blade dynamics signal or signals may represent, for example, vibration in non-rotating elements of the helicopter or control loads in rotating elements of the helicopter rotor assembly, and the performance of the method and system of the present invention is dependent upon the frequency components of the blade dynamics signal or signals that are used to correct or adjust the flight control inputs so as to reduce the control loads on the rotor assembly elements. For example, the outer loop will preferably operate with an $N^{th}$ harmonic of the blade dynamics signal of signals to reduce vibration in non-rotating elements of the helicopter, and with a second harmonic of the blade dynamics signal or signals to reduce control loads in rotating elements of the helicopter rotor assembly. In a typical implementation, the $N^{th}$ harmonic of the blade dynamics signal that is selected to reduce vibration in non-rotating elements of the helicopter will preferably be in the frequency range of 4 to 7 times the rotations per second of the rotor assembly.

DETAILED DESCRIPTION OF THE INVENTION

A. Introduction

As described in detail in the following, the present invention provides a helicopter rotor control system having individual pitch control of each of the rotor blades through an individual pitch actuator for each blade and a rotor pitch control system that measures the vibration causing factors acting upon the rotor blades, determines a dynamic rotor pitch control signal for each individual rotor blade, and controls each rotor blade individually through an associated individual pitch actuator to dynamically correct or compensate for the factors causing vibration in each rotor blade individually.

As discussed above, the rotor control systems of the prior art typically determine a single rotor control signal as a factor of the desired lift from the rotor and the speed and direction signals generated from the pilot controls. That single control signal is then mechanically, electrically or hydraulically phase shifted and applied to the rotor swash plate, or the control spider, which operates essentially as an azimuth dependent cam mechanism acting upon the rotor control horns to control the pitch of each rotor as each rotor travels around its rotational path.

Figure 1A:
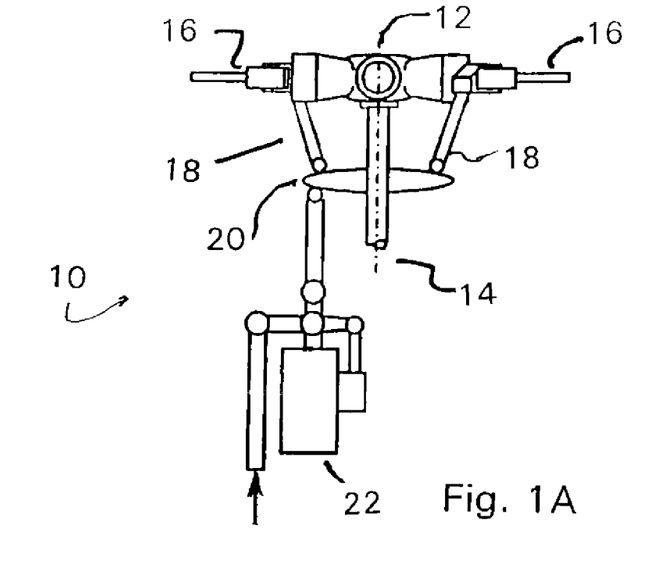
FIG. 1A is a diagrammatic representation of the rotating elements of a conventional rotor assembly.

This basic mechanism is illustrated in FIG. 1A, wherein it is shown that a rotor assembly 10 includes a rotating rotor hub 12 that is rotated by a rotor mast 14 and that supports a plurality of rotor blades 16 that extend radially from the hub 12 in the rotor plane generally defined by the plane of rotation occupied by all of the rotor blades 16. Each rotor blade 16 is attached to rotor hub 12 in such a manner as to allow both vertical motion of each blade 16 with respect to a hinge point at the attachment of the blade 16 to the hub 12 and rotational pitch motion relative to the plane of rotation. As shown, the pitch of each blade 16 is controlled by a push rod 18 that is connected between a lever arm of the blade 16, referred to as a pitch horn, that rotates the blade about its pitch pivot point and a corresponding point on a swash plate 20. The control signal representing the outputs of the pilot controls is provided to a swash plate actuator 22 which, in turn, controls the angle and azimuth of tilt of swash plate 20 with respect to the rotational plane of blades 16 and the longitudinal axis of the helicopter. Swash plate 20, in turn, acts through the push rod 18 connections between swash plate 20 and the individual blades 16 to control the pitch and elevation angle of each blade 16 in its path around the rotational plane of rotor blades 16.

In the system of the present invention, however, the pitch of each blade 16 is controlled individually and according to the dynamic forces acting upon each blade 16, which include, for example, the vibratory forces originating from the motion of the blade 16 itself and the aerodynamic forces acting on the blade 16 during its rotational path, and the control forces acting upon the rotor assembly 10 and blades 16 as a result of pilot control inputs, vibrations from the power train and vibrations originating in the helicopter structures.

Figure 1B:
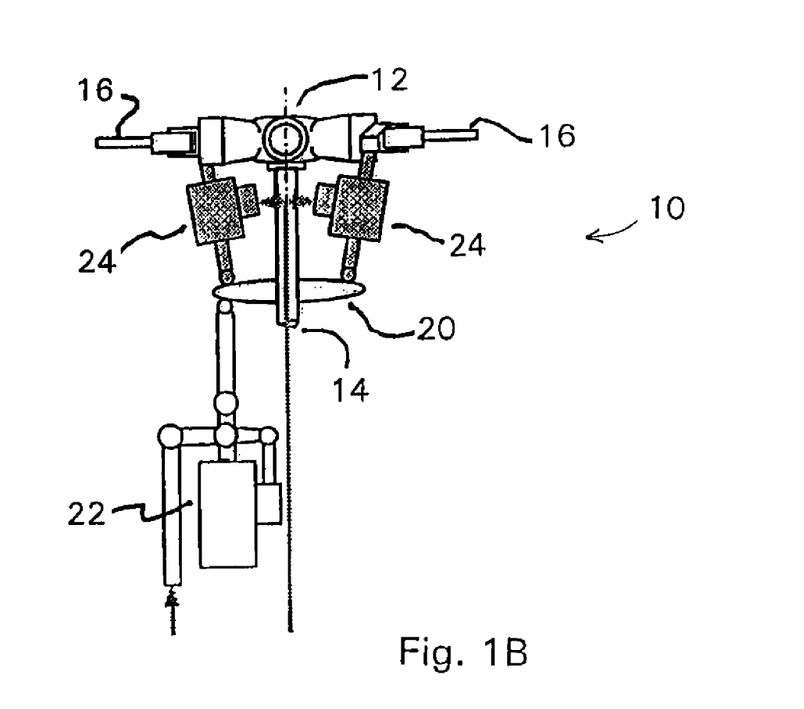
FIG. 1B is a diagrammatic representation of the rotating elements of a rotor assembly of an implementation of the present invention.

In one exemplary embodiment of the present invention as illustrated in FIG. 1B, for example, and as illustrated in FIG. 1B, there is an Individual Blade Control (IBC) pitch actuator 24 associated with and controlling the pitch of each rotor blade 16 and the control system generates an individual rotor control signal for each individual IBC pitch actuator 24, so that each blade 16 is individually controlled according to the dynamic forces acting on each blade 16. As indicated, the system continues to provide a signal or signals representing the pilot control inputs to the swash plate actuator, but also provides individual control signals to each of the IBC pitch actuators 24 wherein the signals to the IBC pitch actuators 24 are generated to compensate for and offset such blade forces as, for example, vibrations from the blade itself and vibrations from the power train and the aircraft fuselage.

B. General Discussion of Individual Blade Control (IBC) Systems

Individual Blade Control (IBC) systems have been under consideration for helicopters for some time because of a number of perceived benefits, such as the reduction of fuselage vibrations, thereby improving flight comfort, the reduction of noise generated by the rotor, particularly when descending, and the reduction of the power required in high speed level flight. It has been difficult, however, to achieve an actual implementation of a practical, effective IBC system.

As will be described in the following, an IBC system of the present invention is capable of effectively addressing the problems of reducing fuselage vibrations, reducing noise generated by the rotor and reducing the power required in high speed level flight.

In addition, an IBC system of the present invention is capable of addressing a fourth factor that has not been considering by IBC or HHC systems of the prior art, that of reducing control system loads, that is, the forces acting on the various control system elements, such as the rotor blades and actuators, and the forces necessary to actuate the control system elements according to the control needs of the aircraft.

In this regard, there has previously been no means by which a conventional helicopters could alter its control system loads during flight and the control system loads were prescribed during the original design process by the basic helicopter and control system designs and subsequently by the current flight conditions, such as speed, altitude, load, weather, and so on. The loads and load capacity of the helicopter control system are, however, the product of many design compromises. For example, the components of the control system have to be designed with sufficient strength to withstand the anticipated control loads as the helicopter could be lost if even one component in the control system fails. In conflict with this goal, however, is the need for the design to save weight, thereby improving load carrying capacity and performance but reducing the component strengths. These problems are compounded because some components in the control path do not have an infinite lifetime and hence need inspections and possible replacement on a frequent basis, which is costly and reduces the utilization of the helicopter.

Therefore first considering certain of the approaches to IBC systems that have been considered in the prior art, one approach of the prior art to an IBC system has been referred to as "blade root actuation". In this method, the push rods between the swash plate and the blade pitch horns are replaced by actuators, as illustrated above with respect to FIG. 1B. Other methods include the trailing edge flap method, which employs actuators integrated into each rotor blade and acting on a small trailing edge flap, and the elastic blade twist method, wherein each blade has elastic properties and is twisted by "smart" actuators integrated into the rotor blades.

In addition to the above IBC systems of the prior art, another form of prior art system, referred to as Higher Harmonic Control (HHC) systems, employ actuators located in the non-rotating frame below the swash plate. HHC systems, however, are not capable of controlling the important $2^{nd}$ harmonic of the rotor rotational speed (2 W) for rotors using more than 3 blades for mechanical reasons. In addition, it has been found that because the actuators are located in the rotating frame, IBC systems are capable controlling both harmonic and non-harmonic functions and of superimposing the corresponding compensating signals onto the pilot's control signals, while systems wherein the actuators are not located in the rotating frame are not.

As will be described in the following, the present invention may be implemented in conjunction with any of these three methods for blade pitch control, as well as with HHC systems and other methods for controlling the pitch of the blades.

C. Principles of Operation of an IBC System of the Invention

An IBC system of the present invention allows the dynamic manipulation of the pitch angle of each individual rotor blade in such a manner as to reduce control system load, as well as reducing fuselage vibrations, noise generated by the rotor and the power required in flight.

Figure 2:
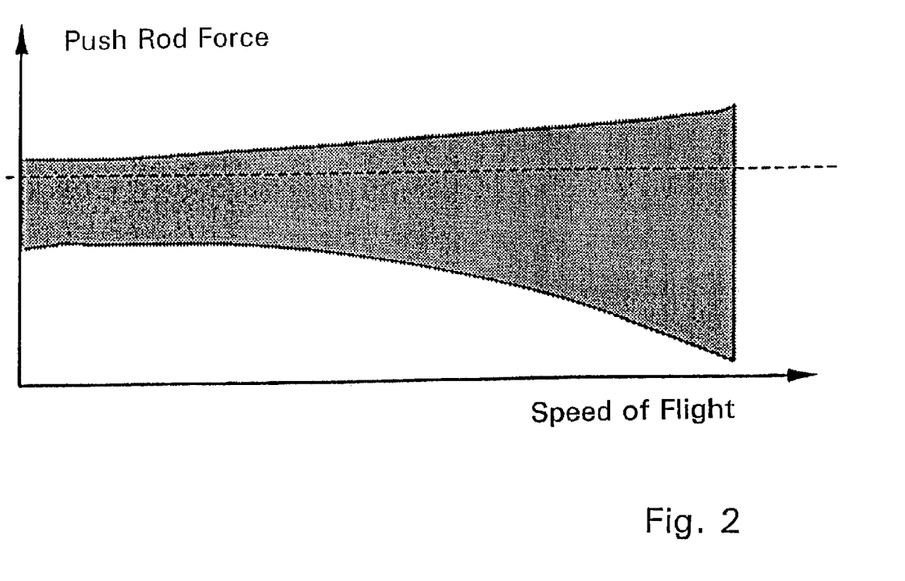
FIG. 2 is an illustration of an envelope of maximum and minimum push rod loads over a range of helicopter speeds.

The benefits of an IBC system according to the present invention in terms of reduction in control loads is illustrated, for example, in FIG. 2, which illustrates an envelope of maximum and minimum push rod loads over a range of helicopter speeds. It should be noted that FIG. 2 does not include the blade stall condition because the forces change dramatically beyond the stall speed. It should also be noted that the push rod control loads illustrated in FIG. 2 also act upon, for example, the swash plate or control spider and the control boosters.

It will be apparent that the implementation of an IBC system of the present invention first requires recognition that the control system of a helicopter extends from the blade pitch horns to the boosters or other control elements that process and amplify the force signal inputs from the pilot controls to generate the signals controlling the blade pitch elements. It must be further recognized that this control system is essentially comprised of two sub-systems, or sub-assemblies. One sub-system is comprised of the control system elements that are located in the non-rotating frame, such as the pilot input signal boosters, and the other is comprised of the control system elements that are located in the rotating frame, such as the rotors and pitch horns, wherein the two sub-systems are separated by the swash plate, or "control spider". It will be recognized that while the two sub-systems operate together as a single system, consideration of the physical and functional separation of the two sub-systems is necessary because the frequency components of measured control loads differ significantly between the rotating and non-rotating frames.

Also, it has been described above that an IBC system of the present invention superimposes additional control signals to the pilot's primary controls wherein the additional control signals are generated to compensate for and offset such blade forces as, for example, vibrations from the blade itself and vibrations from the power train and the aircraft fuselage. The compensating or correcting signals are typically generated from signals detecting and measuring selected aspects of the operation of the rotor system, and one of the issues addressed by the present invention is which signals or which frequency range of signals is most useful in generating the compensating signals.

For example, it has been noted that the harmonic components of, for example a rotor vibration signal, are particularly significant in generating compensating IBC control signals for reducing rotor vibrations and rotor noise and improving the rotor efficiency to reduce fuel consumption. Stated another way, it is advantageous that the additional compensating control signals generated from input signals representing unwanted vibrations are or contain pure harmonic functions of the rotor azimuth; that is, that the frequency components used in these harmonic functions are multiple integers of the rotor rotational speed W. In this regard, and in particular and as discussed further in following discussions, it has been discovered that the $2^{nd}$ harmonic of the rotor rotational speed (2 W) is of particular significance.

To illustrate, in a compensating IBC control signal based on a pure harmonic function the blade pitch function can be expressed as:

$$\vartheta_i = \underbrace{\vartheta_0 + ...}_{Pilot} + \underbrace{\sum_{n=k}^{N} A_n \cos(n\psi_i - \varphi_n)}_{IBC}$$

wherein y is the rotor azimuth (y=Wt, t=time), $J_0$ Is the pilot's collective pitch and $A_n$; $j_n$ and n are the parameters of the IBC-input signal or signals that is, the input signal or signals representing factors to be reduced or compensated for by the IBC system, such as rotor or power train vibration. The IBC input signal parameters will typically include, for example, IBC input signal amplitude, IBC input signal phase and one or more integral multiples of the rotor rotational speed, representing the IBC input signal harmonics.

Figure 3:
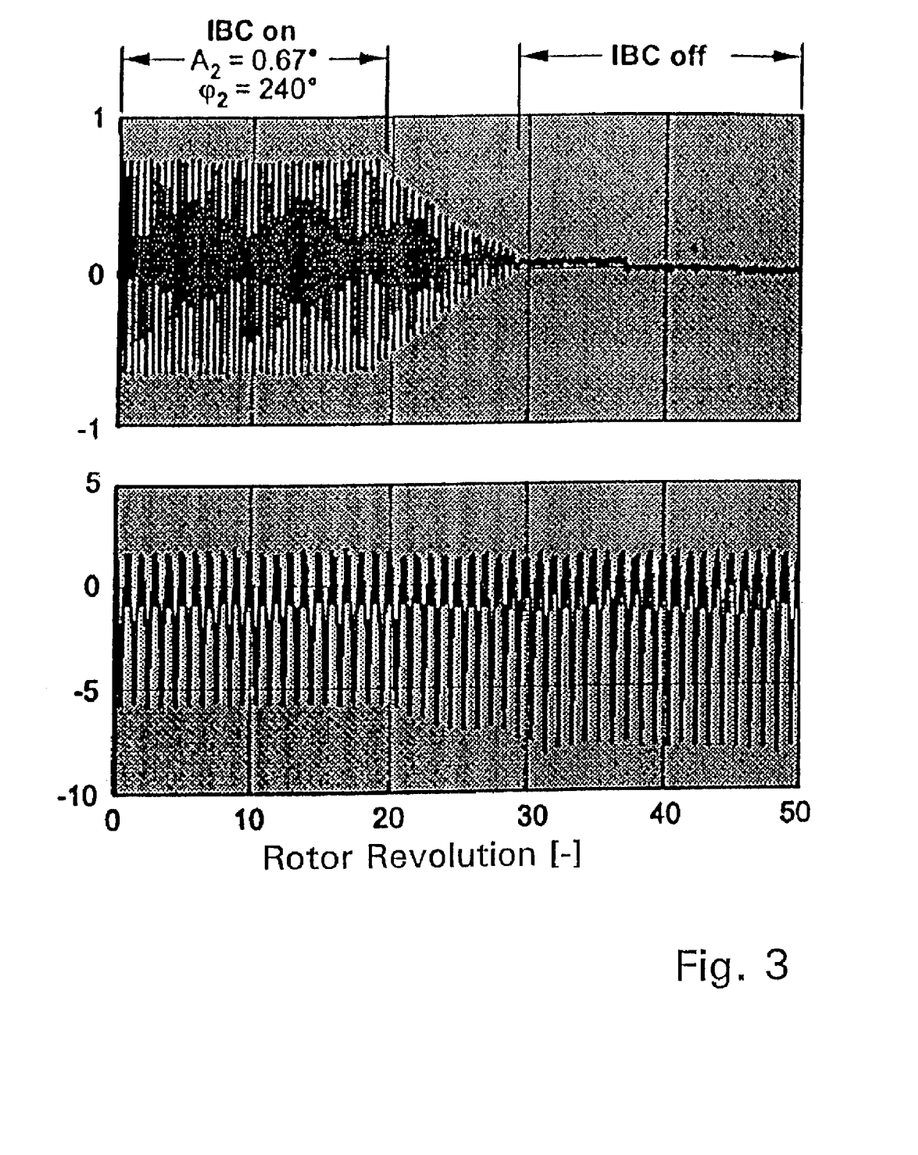
FIG. 3 is an example of a pitch link load reduction for high speed and level flight using an IBC control system based on a pure harmonic functions of the rotor speed.

An example is illustrated in FIG. 3, which shows an example of a pitch link load reduction for high speed and level flight using an IBC control system based on a pure harmonic functions of the rotor speed. In this example the IBC control signal has been limited to the application of the $2^{nd}$ rotor harmonic (2 W), a frequency that is often denoted as 2/rev.

D. Methods of Control Load Reduction

According to the present invention, there are two primary methods for implementing an IBC control system.

The first method operates in the time domain, rather than the frequency domain like the pure harmonic system summarized above. In the time domain method, the variables to be controlled, such as rotor, power train or fuselage vibrations, are directly measured in the time domain and, if necessary, filtered and passed through analog-to-digital (A/D) convertors to obtain information representing, for example, vibrations in the system. The resulting signal or signals representing the variable or variables to be controlled or reduce are then passed to an IBC control system processor, which computes and generates corresponding IBC actuator stroke commands to offset or compensate for the variables to be reduced or controlled.

In the simplest case the IBC control system is implemented by an algorithm that proportionally amplifies the measured control error, that is, the signal representing the variable or variables to be reduced or controlled. According to the present invention, however, essentially any time domain control algorithm that is capable of reducing or controlling the chosen control load, that is, the chosen variable, could be used in an IBC time domain system of the present invention. It should also be recognized that such an IBC system can be implemented as a fully analog system or, with appropriate A/D and D/A conversions, as a digital system, or as any desired mixture or combination of analog and digital elements.

The second method for implementing an IBC system of the present invention operates in the frequency domain and recognizes that the frequency spectrum of the control load variables imposes on the elements of the control system of a helicopter is dominated by a set or group of special frequencies, particularly when the pilot control inputs are constant. This method will be recognized as of the same basic nature as the exemplary pure harmonic function system discussed above in the case of constant pilot input.

According to the present invention as implemented in the frequency domain, the control loads in the rotating portions of the control system are dominated by multiples of the rotor rotational frequency W, which are referred to as rotor harmonics. The present invention further recognizes that only the first harmonics, that is, the lower order harmonics, are significant because the amplitudes of the harmonics decrease rapidly as their order increases.

In addition, the present invention further recognizes that the control loads in the non-rotating portions of the system are dominated by multiples of the blade number harmonics (NW, 2 N W, 3 NW . . . ), wherein N is the number of rotor blades in the rotor assembly. The method of the present invention also recognizes that, again, only the lower order harmonics are significant in most applications because the amplitudes of the blade number harmonics decrease rapidly as their order increases.

Figure 4:
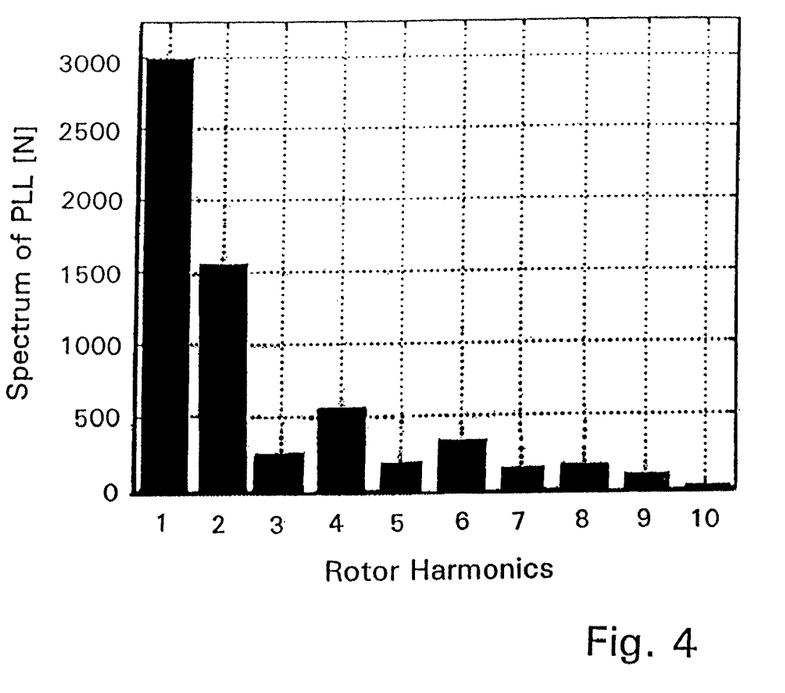
FIG. 4 is an example the amplitudes of the rotor harmonic components of a pitch link load.
Figure 5A:
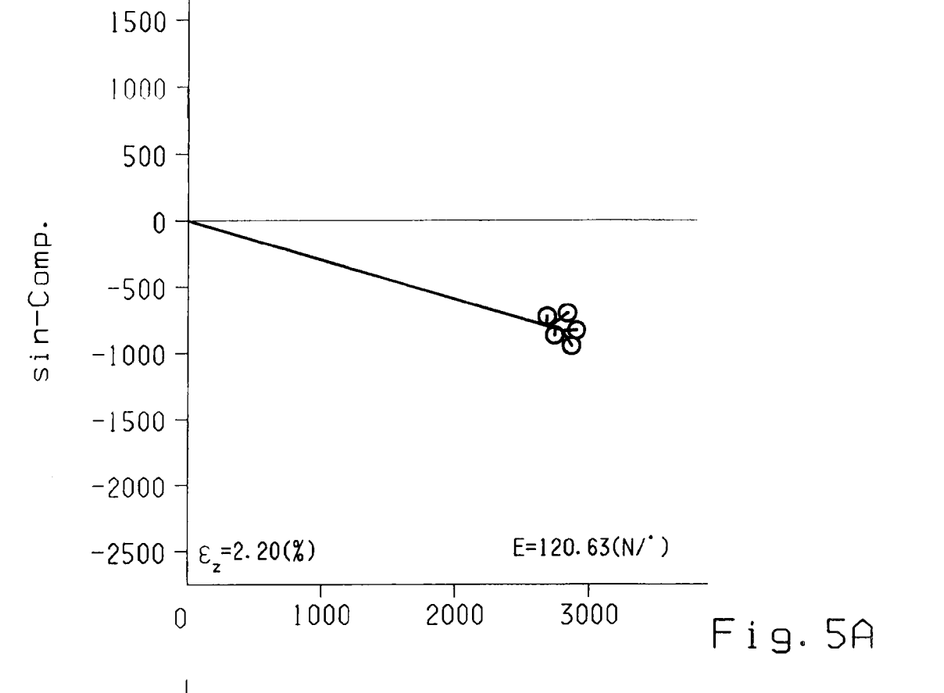
FIGS. 5A, 5B, 5C, 5D, 5E and 5F are polar plot illustrations of the effects of an IBC system on first and higher order rotor blade harmonics for a pitch link load.
Figure 5B:
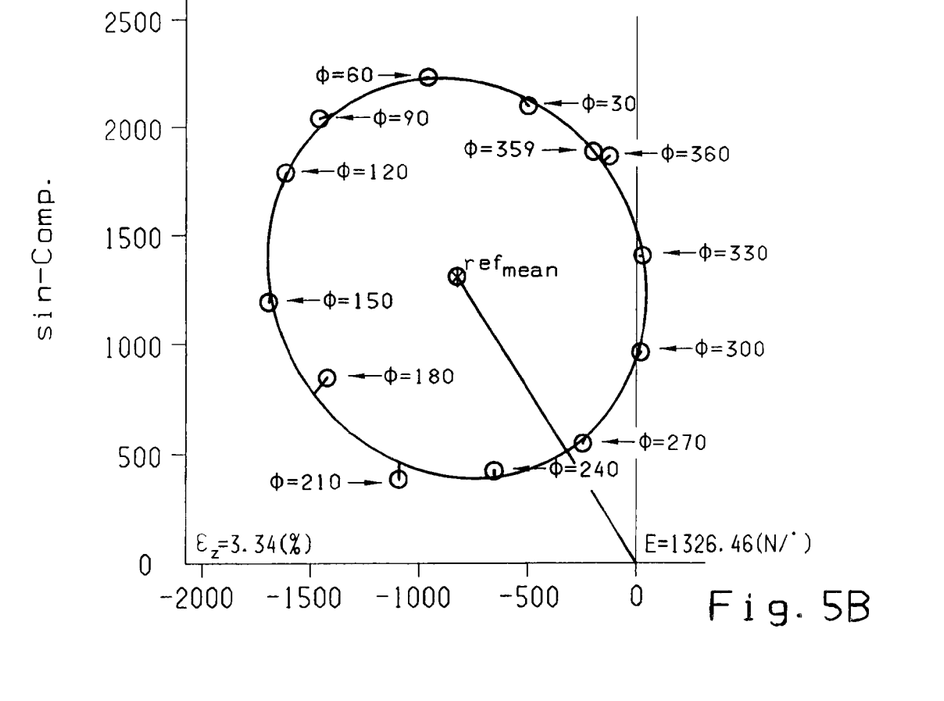
Figure 5C:
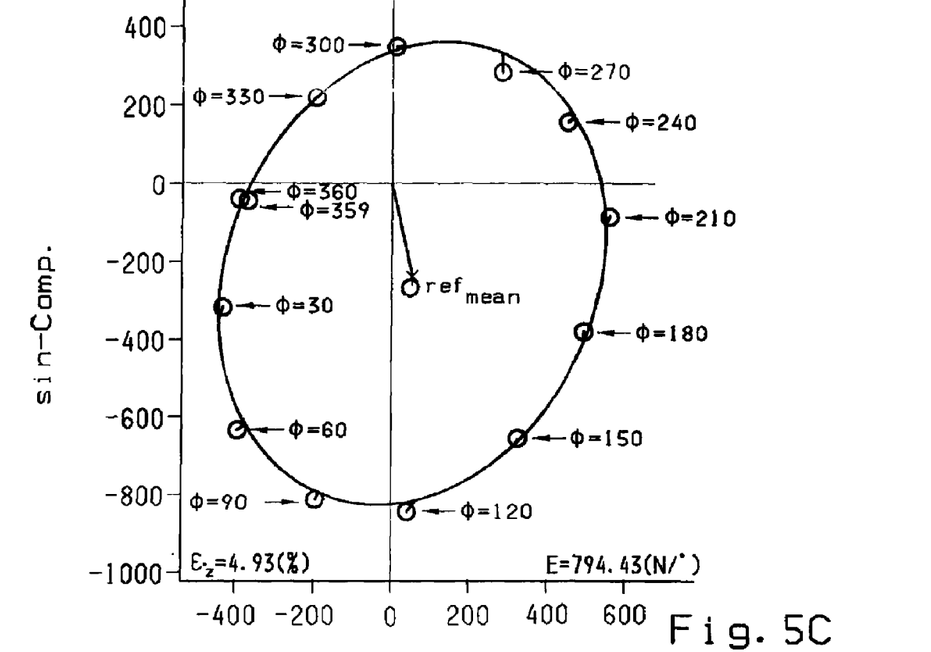
Figure 5D:
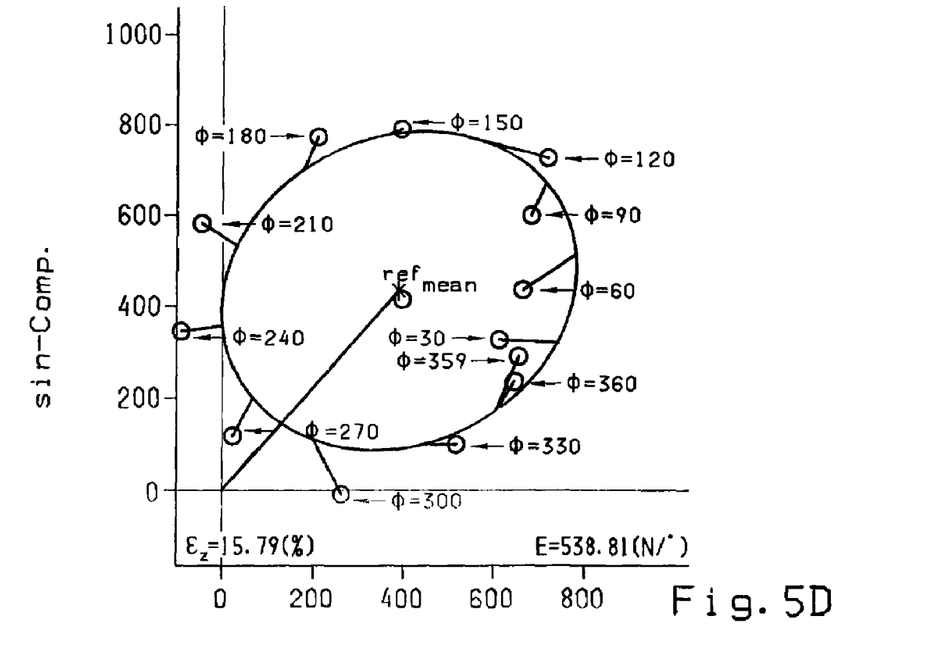
Figure 5E:
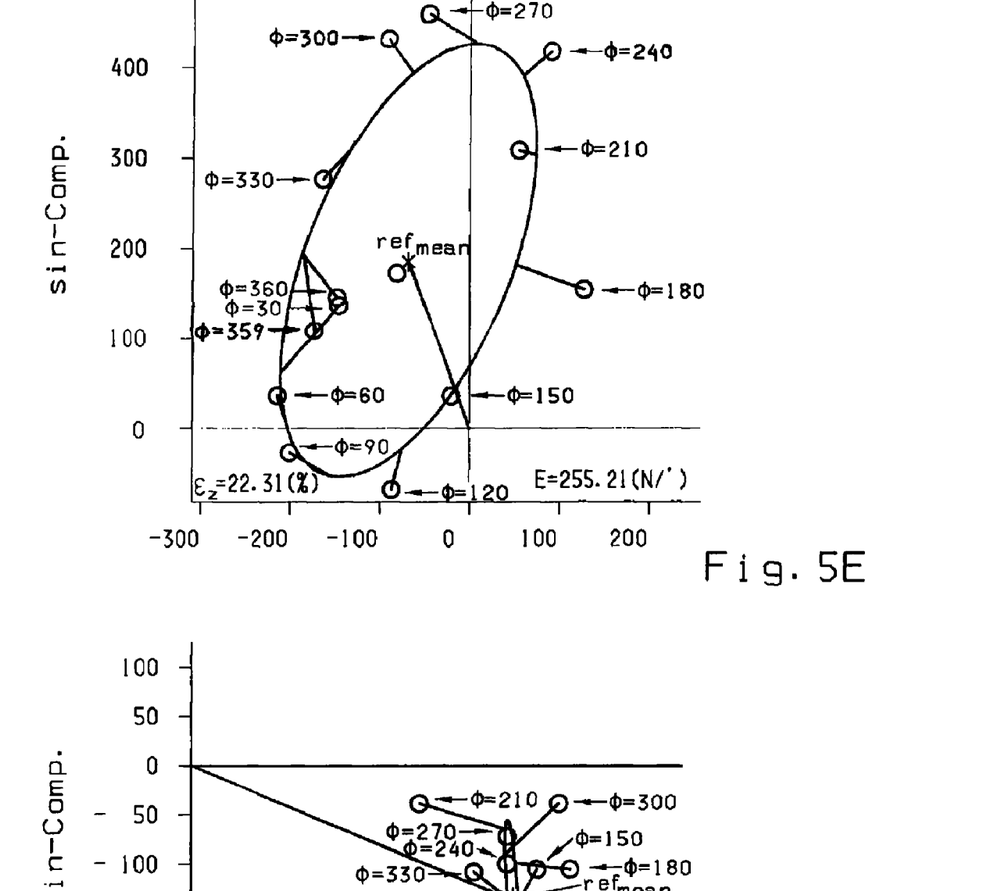
Figure 5F:
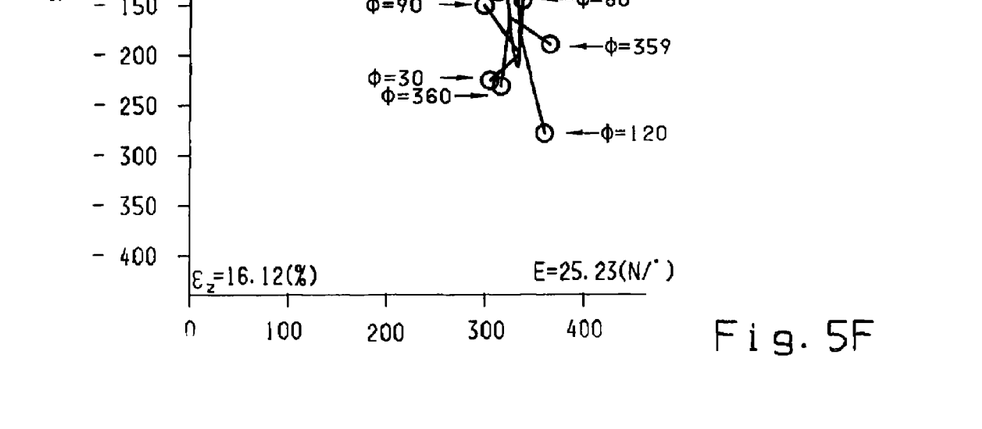

The above principles of the present invention are illustrated in FIG. 4, which shows as an example the amplitudes of the rotor harmonic components of a pitch link load, which is in the rotation portion of the system, being the linkage between the rotor pitch horns and the swash plate or pitch actuators. It will be apparent that the first and the second rotor harmonic components are significant due to their large amplitude compared to the higher order rotor harmonic components.

It should be noted that the first rotor harmonic component is primary influenced by the flight control inputs of the pilot or inputs from any assisting flight control systems and is therefore an effect of the flight mechanics. As such, the first rotor harmonic component can only be marginally influenced by the IBC system, whereas the higher order rotor harmonic components can be significantly influenced by an IBC system. The effects of an IBC system on the first and higher order harmonics is illustrated in polar plots for the pitch link load as shown in FIGS. 5A, 5B, 5C, 5D, 5E and 5F.

The plots presented in FIGS. 5A-F correspond to an IBC system input with a frequency which is twice the rotor rotational frequency (so called 2/rev IBC-input), and have been computed from actual flight test results. During these flight tests, the IBC system output signal amplitude has been kept constant and the phase of the IBC output signal has been varied from 0° to 360° in certain phase steps. The pitch link load has been measured and the sine and cosine components of the first six harmonics of the pitch link loads has been computed, as well as the ellipses representing models, which are experimentally identified from measurement data and which can be used as model for a model based controller synthesis, as described in a following discussion. It will be noted that six models, and thus six ellipses, are illustrated in FIG. 5, one for each combination of an IBC-frequency and rotor harmonic or blade harmonic component of the control load. It should be recognized that the areas of the ellipses are a measure or the efficiency, or capability, of the corresponding IBC-input to alter the single rotor or blade harmonic components of the control load.

In summary, it is sufficient to control, that is, to reduce or to minimize, a finite set of rotor or blade harmonic components of the control load, using rotor harmonic IBC-inputs which are clearly defined by a set of IBC-amplitudes and IBC-phases of the appropriated IBC-frequencies, in order to reduce or minimize the control loads in the rotating or non-rotating system of a helicopter. In the simplest case, an IBC-input consisting of one IBC-frequency may be used to reduce one harmonic component of a control load within a control task, which will result in the reduction of the corresponding harmonic component load and a corresponding reduction in the overall control load. Referring to the examples shown in FIGS. 4 and 5, this means that in this case the reduction of the pitch link load in the time domain is possible by reducing or controlling only the second rotor harmonic part of the pitch link load using a 2/rev IBC-input.

As will be described in the following descriptions, either of the time or frequency based methods may be employed in implementing a model based IBC controller system, and every model that is capable of describing transfer behavior from the rotor harmonic IBC-inputs to the rotor or blade harmonic control load components, that is, the variables to be controlled, can be implemented in an IBC controller.

To illustrate, if the dimension of the input vector is defined by the number of IBC-frequencies and the dimension of the output vector, the variables to be controlled, and by the number of measurands and their rotor and blade harmonic components, the core of the overall model may be based on the following Single Input Multiple Output (SIMO) system:

$$Z_j = T_j J_j + Z_{0j}, j=1, \ldots, p \qquad (2)$$

where
$Z_j = [Z_{c1}, Z_{s1}, \ldots, Z_{cq}, Z_{sq}]^T$,
$Z_{0j} = [Z_{0c1}, Z_{0s1}, \ldots, Z_{0cq}, Z_{0sq}]^T$,
$J_j = [J_{IBCc}, J_{IBCs}]_j^T$
$T_j = [(T_{11}, T_{12}; T_{21}, T_{22}); \ldots ; (T_{(2q-1)1}, T_{(2q-1)2}; T_{2q1}, T_{2q2})]_j \hat{I} IR^{2q,2}$
and:
p number of inputs (IBC-frequencies)
q number of outputs (variables to be controlled)
$Z_j$ output vector (variables to be controlled, divided into cosine and sine components)
$Z_{0j}$ values of output vector components without IBC-input (reference values)
$J_j$ input vector (IBC-inputs divided into cosine and sine parts).

The above SIMO model describes the influence of an input vector consisting of one IBC-frequency on the output vector, which consists of all rotor or blade harmonic components of all control loads which should be regarded.

For each IBC frequency, j=1, . . . , p equation (2) can be identified, for example, with the well known methods of experimental system identification. Based on these p SIMO models, a multiple input multiple output (MIMO) model will be built. This MIMO model summarizes the effect of the p IBC frequencies that are of interest for the control load reduction on all q outputs:

$$Z = [T_1, \ldots, T_p] J + 1/p\, S\, Z_{0j} \qquad (3)$$
$$= TJ + Z_0$$

with $$J = [J_1^T, \ldots, J_p^T]^T \hat{I} IR^{2p,1}$$

$$T = [T_1, \ldots, T_p] \hat{I} IR^{2q,2p}$$

Using one IBC input and one output, the above given equation simply writes as:

$$Z = TJ + Z_0 \qquad (4)$$

with
$Z_j = [Z_c, Z_s]^T$,
$Z_0 = [Z_{0c}, Z_{0s}]^T$,
$J = [J_{IBCc}, J_{IBCs}]^T$
$T = [T_{11}, T_{12}; T_{21}, T_{22}] \hat{I} IR^{2,2}$ This model describes the stationary transfer behavior of the IBC-inputs on fuselage vibration, and is here used in the context of the vibration reduction as a model for model based controllers. Hence, the application of this model is being limited in this example to applications on measurements in the non-rotating frame.

E. Discussion of an Exemplary IBC System for Reducing Control System Loads

In the context of the present invention for control load reduction, the use of the above described model or models is extended to the control system loads in the non-rotating as well as the rotating frame. Moreover, the application of this model is not limited with regard to the outputs or the frequency of the first blade number harmonic (N W, N=blade number), but is extended to outputs having frequencies that are multiple integer of the rotor frequency (2 W, 3 W, 4 W . . . ), as illustrated in FIG. 5.

Figure 6:
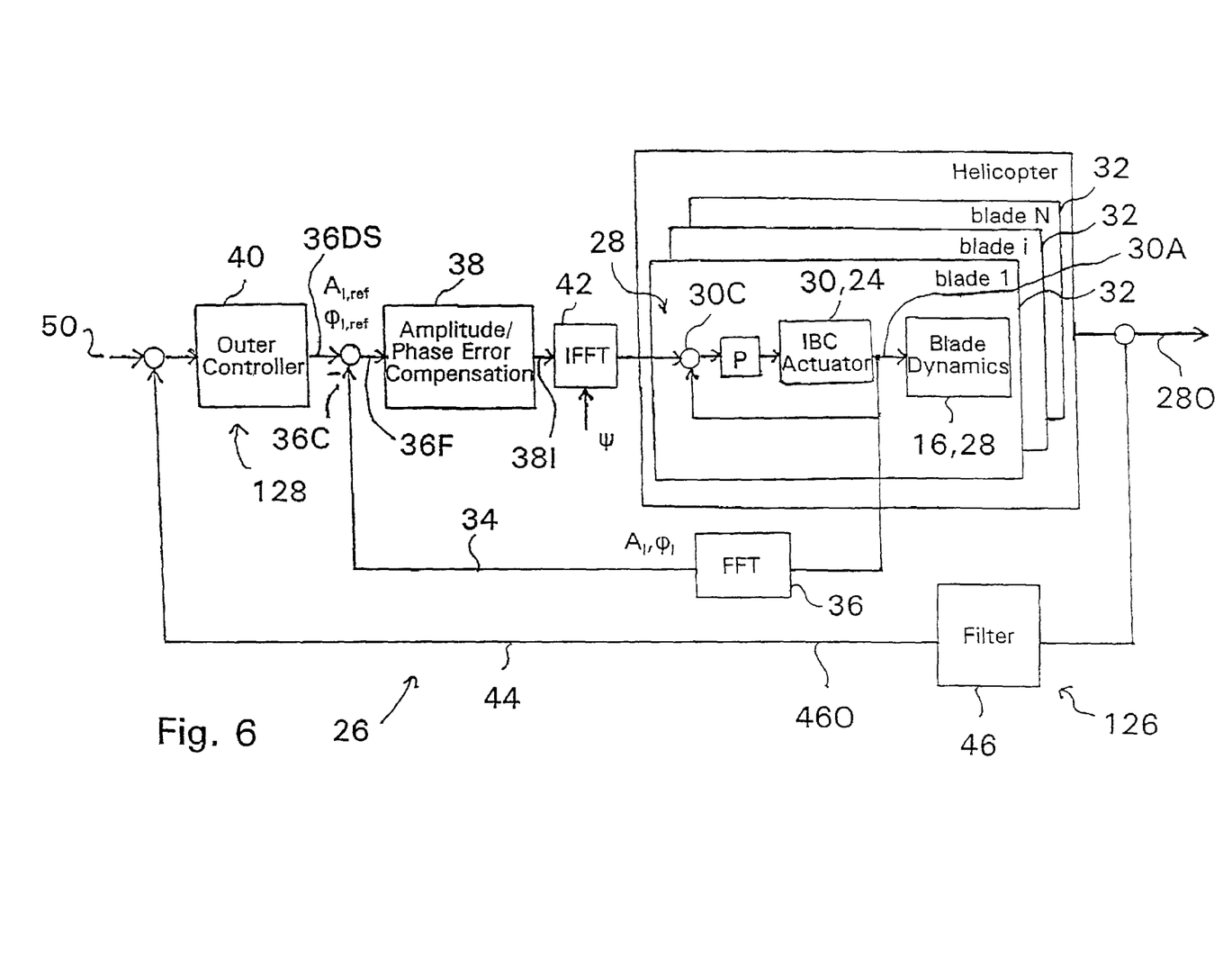
FIG. 6 is a diagrammatic representation of an exemplary IBC controller system for reducing the control system loads of an rotary wing aircraft.

An exemplary IBC controller system 26 for reducing the control system loads of an rotary wing aircraft is being shown in FIG. 6.

According to the present invention as embodied in the exemplary IBC control system, IBC control system 26 includes an inner control loop 28 whose primary function is to match the actual actuator control stroke position closely as possible to the commanded actuator control stroke position, that is, to effectively match the actual pitch position of the blade 16 to the desired pitch position of the blade 16. As shown, each inner control loop 28 includes an IBC actuator controller 30 controlling the blade pitch actuator 24 of the corresponding rotor blade 16 wherein, in a simple case and for example, actuator controllers 30 may be proportional controllers. The position of the actual actuator stroke is indicated by a position signal output 30A of the actuator controller 30 and the position signal 30A of each actuator 30 is fed back to a comparator 30C that also receives an input signal indicating the commanded actuator stroke position, with the comparison being used to correct the control signal to the actuator 30 so that the actuator stroke is at the commanded position.

An IBC control system 26 may also include an intermediate control loop 34 for minimizing deviations between the actual actuator strokes of IBC actuators 30, that is, the deviations between the actuator strokes physically acting on each of the blades 16. As shown, in a presently preferred embodiment in which intermediate control loop 34 operates in the frequency domain, intermediate control loop 34 includes a Fast Fourier Transform (FFT) processor 36FT receiving the actuator pitch position signal outputs 30A of each the actuator controllers. FFT processor 36FT which converts the actual control stroke outputs 30A from the time domain and into the frequency domain and, in particular, determines the amplitude and phase components of deviations between the actual pitch positions of the blades 16. The inter-blade frequency domain amplitude and phase deviations extracted from actuator pitch position signal outputs 30A are then passed forward to a control stroke comparator 36C, which effectively compares the frequency domain amplitude and phase deviations between blades 16 to corresponding frequency domain desired stroke 36DS outputs of an outer loop processor 40. The comparison generates frequency domain stroke difference outputs 36D that represent the differences, or errors, between the actual and desired control strokes.

The stroke error output 36D for each blade 16 is then passed to an amplitude/phase compensation processor 38, which determines IBC inputs 38I to the IBC actuator controllers 30 wherein IBC inputs 38I are generated so as to will compensate for the detected stroke differences, or errors, between the desired and actual actuator strokes. IBC inputs 38I to IBC actuator controllers 30 will thereby drive the individual blade actuators 24 to provide the actual strokes necessary to compensate for, for example, control loads imposed on the blades 16 and the corresponding blade pitch actuators 24, vibration from various sources, the current flight conditions, the effects of blade dynamics 32, and so on.

It should be noted that intermediate control loops 34 and the outer loop 44, discussed next below, both operate in the frequency domain, as does amplitude/phase compensation processor 38, while the mechanical components of the system, that is, actuator controllers 30, actuators 24 and blades 16, operate in the time domain. For this reason the IBC inputs 38I from amplitude/phase compensation processor 38 are converted into the time domain by means of an Inverse Fast Fourier Transform (IFFT) processor 42 before being provided to actuator controllers 30.

Lastly with regard to intermediate control loops 34, it should be noted that intermediate control loops 34 may be omitted if inner control loops 28 show sufficient stationary and dynamic positioning accuracy.

Referring now to outer loop 44, outer loop 44 performs the primary control load reduction and vibration suppression processes and, for these purposes, includes a filter function 46 connected from IBC control load output 28O and the outer controller processor 40 mentioned above. As illustrated, an IBC control load output 28O is generated for each blade 16 and represents, for example, the control loads imposed on the blade 16 and its corresponding blade pitch actuators 24 and such factors as current flight conditions, including speed, weather, vibration from various sources, and so on, the flight control inputs generated by the pilot, and the effects of blade dynamics 32. The various component parts of an IBC control load output 28O are generated by and from, for example, control inputs to the actuators 22 and 24, and may include outputs from appropriate sensors, such as vibration/acceleration/stress sensors located about the rotor assembly 10, power train and fuselage. Outer loop filter function 44 filters the IBC control load output 28O signals representing the measured actual control loads with respect to rotor blades 16, as described above. Filter function 46 may include, for example, a noise filter to reduce the noise in the control load measurands or, when the control system 26 employs the frequency domain method, as in a presently preferred embodiment, a processor, such as a Fast Fourier Transform (FFT) processor, for computing the harmonic components of the signals representing the pitch link loads wherein the outputs of the outer loop filter function 44 are the variables to be controlled, as represented herein above by Output vector Z.

In this regard, and as described in further detail in following descriptions, it should be noted that in the case of an IBC control system 26 employing the frequency domain method, the filter function outputs include the harmonics of the rotating control loads, that is, the 2 W, 3 W and 4 W components, and so on, and may include only the $2^{nd}$ harmonic, and the harmonics of the non-rotating control loads, that is, the 1 NW, 2 NW and 3 NW component and so on, and may include only the 1 NW harmonic.

The outer loop filter function 44 outputs 46O, which represent the actual control loads, vibrations and so forth imposed on the rotor elements and actuators, are fed forward to outer controller processor 40, which also receives pilot control signal inputs 50 from the conventional pilot controls, which effectively represent the desired actuator 24 strokes. Outer controller processor 40 includes and executes an algorithm for reducing, for example, control loads and vibrations, and may be implemented in either the frequency domain using, for example, a T-matrix model of the rotor and control system, or, as also discussed above, any time domain method providing the desired results.

In this regard, the control algorithms employed in outer loop processor 40 generate a T-matrix model at each time step n and the IBC inputs 38I are computed for the time step n+1 using a linear quadratic optimal control approach. It should also be noted that the control algorithm may be realized as a fixed gain process, that is, as a constant T-matrix model, or it can be realized as an adaptive process with online identification of the model during closed loop control. Outer loop processor 40 thereby delivers an output for each time step of the vector of the IBC inputs J, as shown in the equations above, and, as described, the IBC inputs 38I are converted into time domain signals for the desired IBC actuator strokes, which are then fed to inner control loops 28.

It will be understood that the above described IBC control system 26 and the control loop thereof can be implemented in either analogue or digital form, with the appropriate A/D and D/A conversion functions added as necessary.

It should also be noted that a frequency domain implementation of an IBC control system 26 according to the present invention, as described above, will typically include certain additional functions, which are discussed further in a following description. For example, the control system 26 may include the functionality to automatically determine the frequency components, that is, the harmonics that should be reduced in order to reduce the overall control load. In the simplest case this would be the lowest harmonic, that is, the $2^{nd}$ harmonic, for control loads in the rotating system or the $N^{th}$ harmonic for control loads in the non-rotating frame. The control system 26 may also include the functionality to automatically determine the IBC input frequencies to be used for the control load reduction.

It should also be recognized that IBC control systems 26 may be implemented that are not model based in the manner described herein above and with reference to equation (2) herein above.

F. Exemplary Implementation of an IBC System

Figure 7:
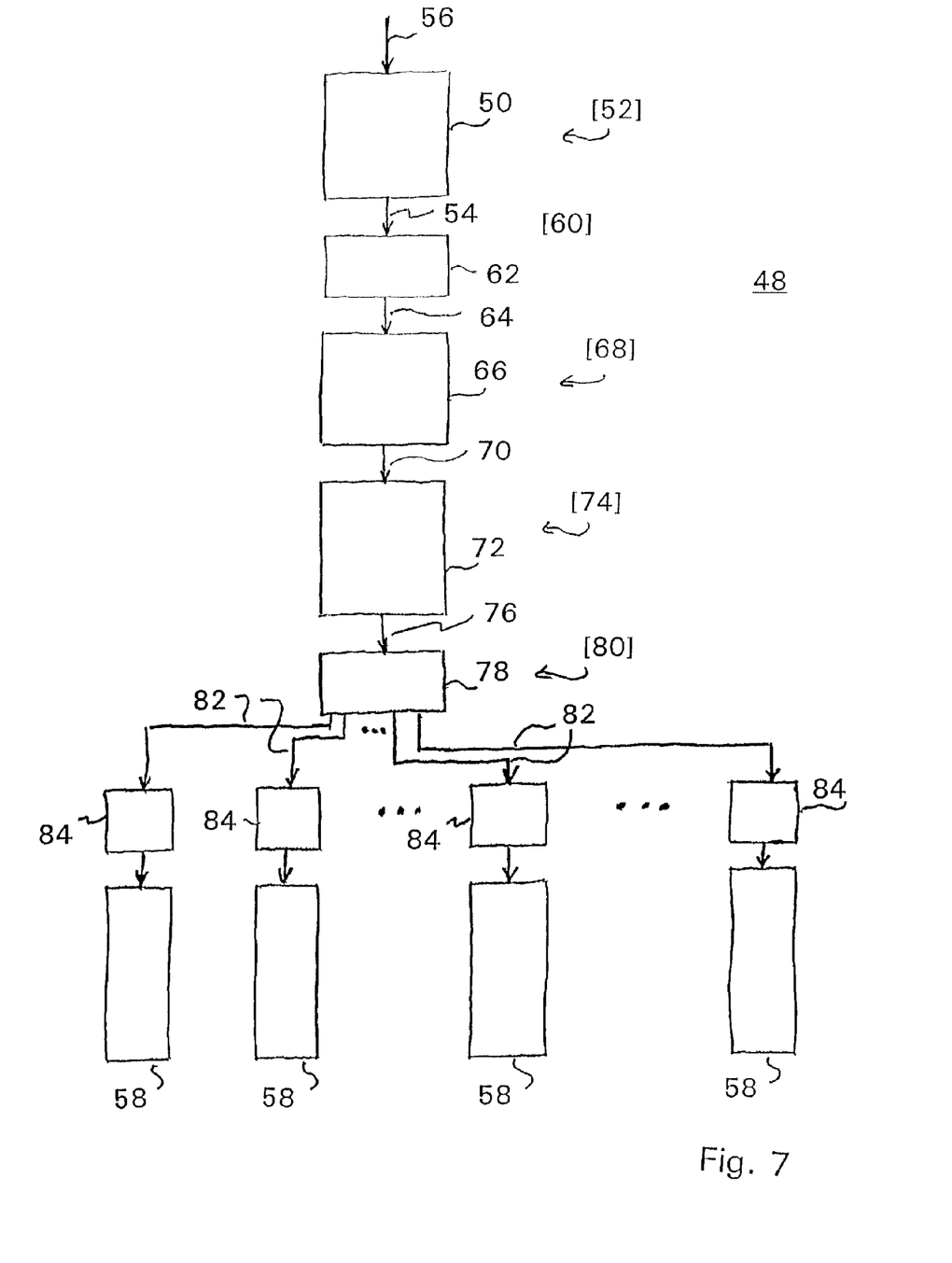
FIG. 7 is a block diagram of an individual blade control system of the present invention.

As will be described in detail in the following, and as illustrated in FIGS. 6 and 7, wherein method steps are designated in brackets [ ], an IBC rotor control system 26 of the present invention employs one or more signal generators to generate [52] input analog measurement signals 54 representing the various forces 56 acting on a rotor blade 58, and in a step [60] coarsely filters 62 the analog measurement signals 54 to eliminate unwanted signal components, resulting in filtered input signals 64. The present invention then employs an analog to digital converter 66 in a step [68] to convert the filtered measurement signals into corresponding digital signals 70. The system 48 then employs a computational processor 72 in a step [74] to generate from the digital signals 70 an individual digital rotor pitch control signal 76 for each rotor blade 58. The present invention then employs a digital to analog converter 78 in a step [80] to convert the individual digital rotor pitch control signals 76 into individual analog pitch actuator control signals 82 and applies each individual analog pitch actuator control signal 82 to a corresponding pitch actuator 84 controlling the pitch of a corresponding rotor blade 58, wherein the individual pitch control signals 82 are calculated to dynamically correct or compensate for the factors causing vibration in each rotor blade 58 individually.

As will be described further in the following, the input measurement signals may include, for example, the pilot control signal inputs, engine and drive train measurements, such as engine speed and transmission input and output speeds, rotor information, such as rotor rotational speed, rotor rotational position, rotor vibrational and dynamic force measurements, aircraft structural vibrational and dynamic force measurements, and so on. As will also be described further in the following, the individual digital pitch control signals may be generated by either time domain processes or by frequency domain processes.

Figure 8:
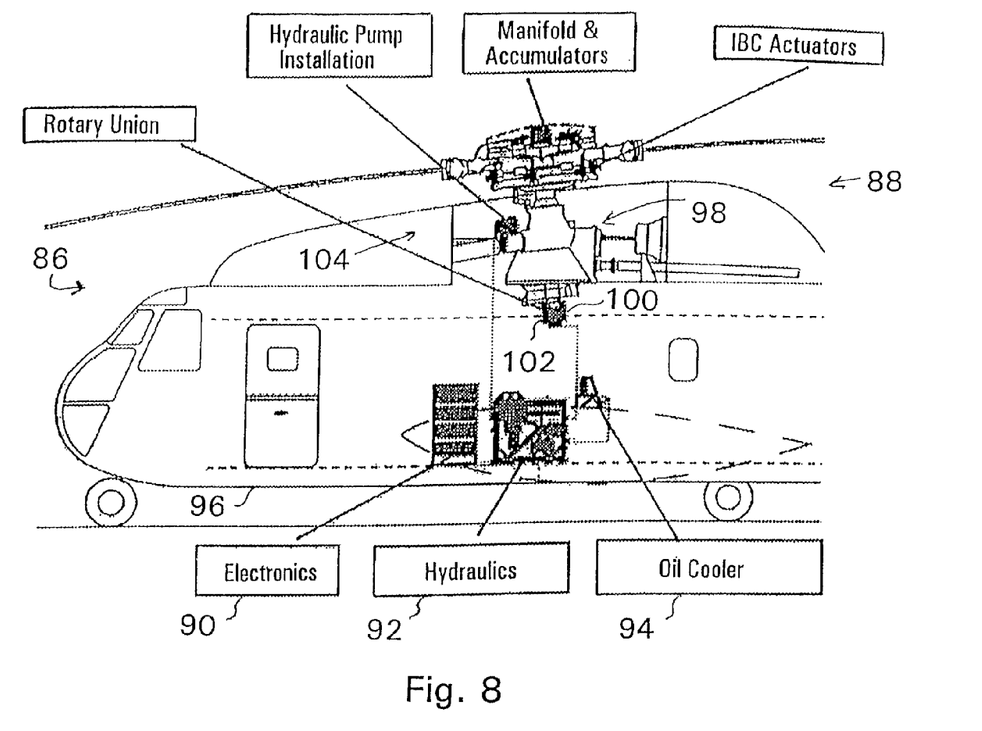
FIG. 8 is a diagrammatic representation of an individual blade control system of the present invention installed in a helicopter.
Figure 9:
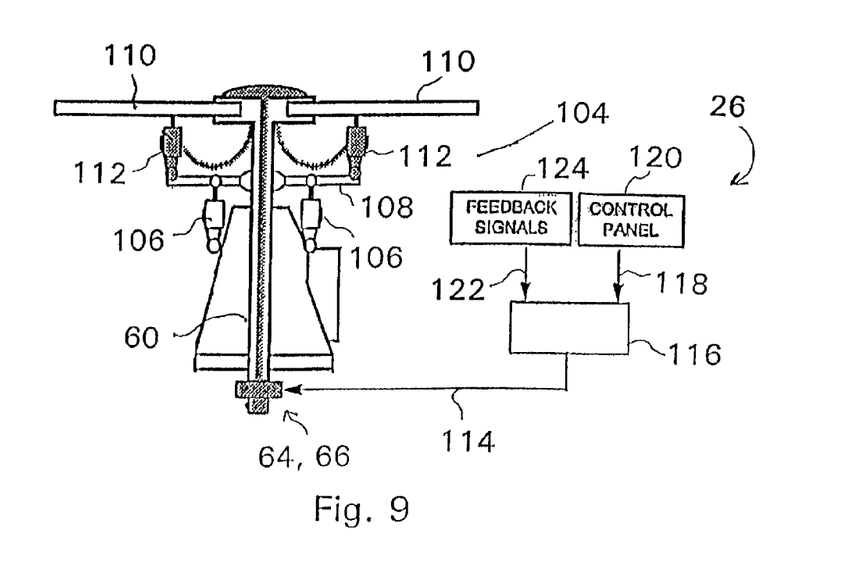
FIG. 9 is a block diagram of an individual blade control system of the present invention installed in a helicopter.

Referring now to FIGS. 8 and 9, therein are presented diagrammatic illustrations of the physical structure and layout of an exemplary IBC rotor control system 26 for an exemplary helicopter 86 according to the present invention and as illustrated above in FIGS. 6 and 7.

As illustrated therein, the hydraulic and control components of the rotor system 88, such as electronics 90, hydraulics system 92 and auxiliary components such as an oil cooler 94 are typically mounted in the fuselage 96 of the helicopter 86 and hydraulic power and electrical control signals are communicated to the rotor shaft assembly 98 through slip rings 100 of a rotary union 102.

As shown in FIG. 9, rotor assembly 104 includes one or more conventional control system actuators 106 connected to a swash plate 108 or control spider, but with each push rod between swash plate 108 or the control spider and the pitch horn of a corresponding one of the rotors 110 being replaced by an IBC pitch actuator 112 that connects to the pitch horn of the corresponding rotors 110. In this implementation, therefore, the rotor control system is essentially comprised of the conventional rotor control system with the IBC control system 26 superimposed onto the conventional system. It will be recognized, however, that in other implementations the functions of the conventional rotor control system could be performed entirely by the IBC control system 26. That is and for example, the conventional control system actuators 106 would be eliminated and the conventional control system rotor control signals combined with the IBC control system signals to the IBC pitch actuators 112.

As indicated generally in FIG. 9, an IBC rotor control system 26 of the present invention as described above provides IBC input signals 114 to conventional control system actuators 106 and IBC pitch actuators 112 through slip rings 100 of a rotary union 102 and is implemented in an IBC controller 116. IBC controller 116, in turn, receives pilot control signal inputs 118 from the conventional pilot controls 120 and IBC feedback signals 122 from IBC sensors 124 that detect and measure, for example, control load, blade vibration and position, fuselage and power train vibration, and so on as also described herein above.

Before continuing, it must be noted that conventional rotor control systems are typically implemented as "open loop" systems, that is, with all feedback between the output of the system, as represented by the actual performance and operations of the rotor assembly and helicopter, being entirely through the human interface, that is, the pilot. The IBC control system 26, however, could be implemented as an open loop system wherein the IBC system 26 is essentially separate from the core conventional system and the corrective or compensating signals generated by the IBC control system 26 are superimposed on the open loop conventional control system signals. This arrangement allows the effects of the IBC control system 26 to be limited or constrained without effecting the conventional control system, and even to be "cut out" of the helicopter control system so that the helicopter operates entirely under the conventional control system. Alternately, however, the IBC control system 26 can be implemented as a closed loop system wherein the IBC control system 26 is the core control system and the pilot input signals are provided as inputs to the IBC control system together with the internal feedback signals of the IBC system.

Next considering the control algorithms employed for vibration and control load reduction in outer loop 44 of the exemplary closed loop IBC control system 26 illustrated in FIGS. 6, 8 and 9, the closed loop control algorithms used to form the outer control loop 44 of FIG. 6 for the vibration and control load reduction tasks are based on frequency domain methods. The frequency domain methods assume a quasi-static linear relationship between the measured harmonic components of vibrations and control loads forming IBC outputs 28O, that is, the measurement outputs z from the rotating and non-rotating elements of the rotor system, and corresponding sets of IBC inputs θ to the IBC processes that result in the IBC input 38I signals to the actuators wherein the quasi-linear relationship is defined by a linear T-matrix model. The IBC inputs θ are characterized by the cosine and sine parts of the 2/rev-7/rev components of the IBC inputs θ from IBC outputs 28O, which are derived from the outputs of the measurement transducers. The IBC outputs 28O from the measurement transducers, designated as outputs z, is, in turn, comprised of the N/rev components of accelerations measured at different sensor locations, such as the main gear box, pilot seat, cargo compartment and tail rotor gear box, and the 2, 3 and 4/rev components of at least one pitch link load sensor as well as the N/rev components of the actuator loads.

In this regard, it is assumed for a number of reasons that in a present implementation of an IBC control system 26 the 2/rev IBC signal harmonic of the control load components is satisfactory for the reduction of pitch link loads. For example, and as discussed above, it has been found that use of the 2/rev component of the IBC input 38I signal provides a satisfactory reduction in the overall pitch link load level, rather than in just one frequency component of the load level, and provides a satisfactory model of the transfer behavior between the 2/rev IBC input 38I signal and the 2/rev component of the pitch link load. In addition, it has also been found that control load reductions based on the 2/rev IBC input 38I signal component appear to have only a small impact on vibration reduction measures based on the 6/rev vibration signal components, thereby avoiding conflict between the load reduction and vibration reduction processes. The 2/rev cosine and sine components of the pitch link loads are therefore preferred outputs for use in the design of a closed loop controller for pitch link load in a present embodiment of an IBC control system 26 of the present invention.

According to the above, the system of the present invention thereby yields a T-matrix model to be used for the controller synthesis wherein $$z_n = z_{n-1} = T_n(\theta_n - \theta_{n-1})$$

where $$z \in IR^{36}, \theta \in IR^{12}, T \in IR^{36,12}$$

and n denotes in this context the current time step.

As described herein above, the primary function of outer control loop 44 is the reduction of vibration and control load and outer loop control 44 includes processes for these functions. In particular, outer control loop 44 includes a system identification task 126, typically implemented in filter function 46, that operates to estimate a linear T-matrix model of the system and provide outputs representative of the measured responses of the system, that is, of control load, vibration, and so on, according to the model. Outer control loop 44 further includes a controller task 128, typically implemented in outer loop processor 40, that operates with the modeled outputs of system identification task 126 to calculate the IBC control inputs 38I necessary to accomplish the desired control task, that is, the reduction of vibration or control load.

System identification task 126 can be performed using various Recursive Least Square (RLS) methods, including standard RLS, RLS with a forgetting factor, stabilized RLS methods, or Kalman filter based implementations. Using these methods, both local and global T-matrix models can be identified and the system identification task 126 is generally able to estimate e-coupled T-matrix sub-models. If, for example, vibration and control loads are to be simultaneously addressed, the impact of 2/rev IBC on all vibration components can be neglected in the identification algorithm used in system identification task 126. For this reason, it is possible to neglect small cross-coupling effects of IBC inputs on outputs in the controller design and selected IBC frequencies can be used to control specified outputs.

For example, the recursive implementation of the Kalman filter based system identification task 126 may be expressed by $$n = 0; \text{initialize } \hat{T}_0^*, P_0$$

$$e_{n+1} = z_{n+1} - \hat{T}_n^* \vartheta_{n+1}^*$$

$$M_n = P_n + qI$$

$$k_{n+1}^T = \frac{\vartheta_{n+1}^{*T} M_n}{\vartheta_{n+1}^{*T} M_n \vartheta_{n+1}^* + r}$$

$$P_{n+1} = M_n(I - \vartheta_{n+1}^* k_{n+1})$$

$$\hat{T}_{n+1}^* = \hat{T}_n^* + e_{n+1} k_{n+1}^T$$

where $$T_n^* := [T_n, z_{on}], \vartheta_n^* := [\vartheta^T, 1]^T \text{ (gobal model)}$$

$$T_n^* := [T_n], \vartheta_n^* := [\vartheta] \text{ (local model)}$$

$$q, r \in IR^+$$

$$M_n, P_n \in IR^{13,13}, k_n \in IR^{13} \text{ (gobal model)}$$

$$M_n, P_n \in IR^{12,12}, k_n \in IR^{12} \text{ (local model)}$$

$$e_n \in IR^{36}, k_n \in IR^{13}, I \text{ as identity matrix}$$

and $z_{on}$ represents the reference values of z without the IBC inputs 38I and is the estimate of x. System identification task 126 is thereby capable of estimating the overall coupled Multiple-Input-Multiple-Output (MIMO) T-matrix, or of estimating sub-models only. If for example vibrations and control loads are to be addressed simultaneously, the impact of 2/rev IBC on all vibration components can be neglected in the identification algorithm. Using this feature it is possible to neglect small cross-coupling effects of IBC-inputs on outputs in the controller design. Therefore, selected IBC frequencies can be used to control specified outputs. For example, the IBC frequencies 4-7/rev are preferred for the reduction of the vibration level and the 2/rev IBC frequency component is preferred and reserved for the control system load reduction functions.

In controller task 128 the computation of the IBC inputs 38I is achieved by an optimization process of minimizing the expression $$J_{ctrl} = z_n^T W_z z_n + \theta_n^T W_\theta \theta_n + \Delta\theta_n^T W_{\Delta\theta} \Delta\theta_n$$

with respect to the identified T-matrix model $$z_n = z_{n-1} + \hat{T}_n(\theta_n - \theta_{n-1})$$

where $$W_z = \text{diag}(w_{z1}, \ldots, w_{z36}) \in IR^{36,36},$$
$$W_\theta = \text{diag}(w_{\theta1}, \ldots, w_{\theta12}) \in IR^{12,12},$$
$$W_{\Delta\theta} = \text{diag}(w_{\Delta\theta1}, \ldots, w_{\Delta\theta12}) \in IR^{12,12},$$
$$\Delta\theta = \theta_n - \theta_{n-1}$$

and the subscript n denotes the current time step. The solution of the above optimization problem is either formulated by using the feedback of measured values of $z_n$ of by using a feed-back of identified reference values. For the feedback of $z_n$ the control law results in $$\theta_{n+1} = (D_n W_{\Delta\theta} + D_n \hat{T}_n^T W_z \hat{T}_n)\theta_n - \alpha D_n \hat{T}_n^T W_z z_n$$

with $$D_n = (\hat{T}_n^T W_z \hat{T}_n + W_{\Delta\theta} + W_\theta)^{-1}$$

and $$0 \leq \alpha \leq 1, D_n \in IR^{12,12}.$$

The solution for $D_n$ for the considered control task 128, that is, minimizing AccPilz using 5/rev-IBC, is typically performed with a reduced set of system matrices and vectors to minimize the required computation operations. This minimal set of rows and columns of the matrices and vectors necessary to compute the optimum IBC-inputs are chosen automatically according to the specification of the current control task. The specification of the control tasks with all its parameters is realized by the parameter sets briefly explained above.

The variety of possible implementations of system identification task 126 allows a corresponding variety of implementations of controller task 128 and allows these algorithms to be "tuned" for optimum performance. For example, outer loop 44 may be implemented as a non-adaptive closed loop wherein there is no system identification during closed loop control and feedback of the measured outputs of disturbances, such as vibrations; as an adaptive closed loop wherein there is system identification during closed loop control and feedback of measured disturbances; as a non-adaptive feed forward loop wherein there is no system identification during feed forward control and feed forward of identified reference values of disturbances; or as an adaptive feed forward wherein there is system identification during feed forward control and feed forward of identified reference values of disturbances.

Lastly, it has been described that the IBC control system 26 may include a noise reduction function to, for example, reduce the noise generated by the rotor system that typically occurs during descent flight conditions. In this instance, the outer loop 44 will include a feed forward structure in which the IBC phase for the 2/rev input is modified by an adaptive gradient based Least Square algorithm. In this process, which will typically be implemented using only the 2/rev frequency components, the 2/rev signal amplitude component is kept to the maximum and only the phase component will be varied. One approach, for example, could be to minimize a noise index relating to the occurrence and strength of aircraft generated noise by means of the above discussed optimization process and wherein the noise index could be based on sound level measurements taken by microphones mounted on the helicopter in the near field of the noise sources.

Since certain changes may be made in the above described invention without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A method for controlling rotor pitch in a helicopter, comprising the steps of:
    generating at least one blade dynamics signal representing at least one dynamic force acting on at least one of a rotor blade rotating assembly and a helicopter non-rotating assembly, the rotor blade rotating assembly including a plurality of rotor blades and a pitch actuator for each rotor blade,
    extracting information representing the at least one dynamic force,
    generating a dynamic force compensation output representing a compensation for at least a portion of the at least one dynamic force,
    receiving flight control signals directing flight of the helicopter from flight controls of the helicopter,
    generating from the flight control signals and the dynamic force compensation output a compensated pitch control signal for each blade of the rotor blade rotating assembly, and
    providing a compensated pitch control signal the pitch actuator of each blade to compensate for the at least a portion of the at least one dynamic force.

2. The method for controlling rotor pitch in a helicopter of claim 1, wherein:
    the at least one dynamic force includes at least one of vibratory forces originating from the motion of a blade, aerodynamic forces acting on a blade, control forces acting upon a blade as a result of pilot control inputs, vibrations from a rotor power train, and vibrations originating in an aircraft structure.

3. The method for controlling rotor pitch in a helicopter of claim 1, wherein:
    the at least blade dynamics signal includes at least one of pilot control signal inputs, engine and drive train measurements, rotor rotational speed, rotor rotational position, rotor vibrational and dynamic force measurements, and aircraft dynamic force measurements.

4. The method for controlling rotor pitch in a helicopter of claim 1, wherein:
    each compensated pitch control signal may be generated by one of time domain processes and frequency domain processes.

5. The method for controlling rotor pitch in a helicopter of claim 1, wherein: the at least one blade dynamics signal represents at least one of vibration in non-rotating elements of the helicopter and control loads in rotating elements of the rotor blade rotating assembly, and
    when the dynamic force is vibration in non-rotating elements of the helicopter, the extracted information represents an $N^{th}$ harmonic of the at least one blade dynamics signal, and
    when the dynamic force is control loads in rotating elements of the rotor blade rotating assembly, the extracted information represents a second harmonic of the at least one blade dynamics signal.

* * * * *